United States Patent [19]

Malcolm

[11] 3,948,343

[45] Apr. 6, 1976

[54] CONSTANT SUPPLY OF VACUUM OR PRESSURE FOR VACUUM OR PRESSURE OPERATED OR ASSISTED SYSTEMS IN VEHICLES

[76] Inventor: Joseph Malcolm, 19 Selina St., Doubleview, Western Australia

[22] Filed: Oct. 21, 1974

[21] Appl. No.: 516,876

[30] Foreign Application Priority Data
Oct. 26, 1973 Australia.............................. 5421/73

[52] U.S. Cl................................ 180/103 R; 60/410
[51] Int. Cl.².......................................... B60K 26/00
[58] Field of Search............. 180/103, 82 R; 303/10; 60/DIG. 10, 409, 410, 413; 188/110

[56] References Cited
UNITED STATES PATENTS

| | | | |
|---|---|---|---|
| 2,482,732 | 9/1949 | Hollerith................................. | 303/10 |
| 2,781,870 | 2/1957 | Clements......................... | 180/103 X |
| 2,940,561 | 6/1960 | Atkin.............................. | 180/163 X |
| 3,139,728 | 7/1964 | Lang....................................... | 60/410 |
| 3,528,522 | 9/1970 | Turke................... | 180/103 |
| 3,572,032 | 3/1971 | Terry............................. | 60/DIG. 10 |
| 3,582,150 | 6/1971 | Williams........................... | 303/10 X |
| 3,669,210 | 6/1972 | Haefner.............................. | 180/103 |

Primary Examiner—Philip Goodman
Assistant Examiner—Terrance L. Siemens
Attorney, Agent, or Firm—Haseltine, Lake & Waters

[57] ABSTRACT

A vacuum or pressure unit to be incorporated in a vacuum or pressure system of a vehicle which operates, or assists in the operation of, at least one vehicle component, the vacuum or pressure unit comprising a pump in fluid communication with the vacuum or pressure system of the vehicle, an electric motor operatively connected to the pump to drive the pump and connected to a source of electrical energy via a pressure responsive electric switch mounted in the vacuum or pressure system of the vehicle, the pressure responsive electric switch being intended to close the electrical circuit between the electric motor and the electrical energy source to activate the electric motor upon the magnitude of the pressure in the vacuum or pressure system being insufficient to operate or assist in the operation of the vehicle components at the desired efficiency.

3 Claims, 5 Drawing Figures

Pressure from hydraulic circuit - 187

CONSTANT SUPPLY OF VACUUM OR PRESSURE FOR VACUUM OR PRESSURE OPERATED OR ASSISTED SYSTEMS IN VEHICLES

This invention relates to a unit for vehicles wherein said unit operates at pressures either above or below atmospheric application.

In particular the invention relates to an auxiliary unit associated with a pressurised or vacuum system for the operation of various vehicle components.

With the present interest in road safety and the enormous cost to society as a result of injury and damage caused by road accidents there has been particular interest regarding failure of vehicle components and the provision of emergency standby equipment in the event of such failure. There is particular concern regarding those vehicles having power assisted components such as brakes, steering, two speed rear axle selector mechanisms, safety door locks, head light shrouds, windscreen wipers and the like. In such cases, where the power assist fails causing the assisted components to fail or operate inefficiently, the power assistance may take the form of both a pressurised or vacuum system. Equally the same problem exists where such components are operated solely by a pressurised or vacuum system. Such operating or power assist systems are dependent solely upon the operation of the engine for the maintenance of either pressure or vacuum.

In the event of engine failure there is no means provided to maintain the operating or power assist system operative causing the components so operated or assisted to become inoperative. In addition it is possible that under particular operating conditions of the vehicles engine that the engine is unable to maintain pressure or vacuum in the power assist or operating mechanism. An example of such an instance is where a vehicle engine is maintained under open throttle conditions for an extended period of time such that it is unable to provide a source of vacuum for vacuum power assist brakes. In the event of the brakes being applied several times or of a leakage the vacuum in reserve will be quickly exhausted resulting in there being no power assist for the brakes.

Although where a power assist system is used in conjunction with vehicle components there is usually some provision to operate the components without the power assist, the efficiency of such operation is much less. In the event of an emergency involving a vehicle having power assisted brakes the sudden change of brake efficiency, as a result of failure of the power assist system, can take the driver completely by surprise and place him in a position where he is unable to cope with the situation.

It is an object of this invention to provide a vacuum or pressure unit to be incorporated in a vehicles vacuum or pressure system, the unit being operated independently of the vehicles engine and maintaining the vacuum or pressure unit fully operative.

In one form the invention resides in a vacuum or pressure unit to be incorporated in the vacuum or pressure system of a trailer vehicle wherein the vacuum or pressure system operates or assists at least one of the vehicles components and is the sole source of vacuum or pressure, the vacuum or pressure unit comprising a pump in fluid communication with the vacuum or pressure system of the trailer vehicle, an electric motor operatively connected to the pump to drive the pump, and connected to a source of electrical energy via a pressure responsive electric switch mounted in the vacuum or pressure system of the vehicle, the pressure responsive electric switch being intended to close the electrical circuit between the electric motor and the electrical energy source to activate the electric motor upon the magnitude of the pressure in the vacuum or pressure system being insufficient to operate or assist in the operation of the vehicle components at the desired efficiency, the pump, electric motor and switch being mounted in a fluid tight vacuum or pressure reserve tank, the reserve tank having a first port through which the pump communicates to the atmosphere and a fluid tight connection between the first port and the pump, and a second port through which the interior of the reserve tank is in communication with the vacuum or pressure system of the vehicle, wherein the second port has incorporated therein a solenoid valve providing a variable flow through the second port, the degree of flow through the solenoid valve being dependent upon the pressure applied to the braking system of the tractor vehicle.

The invention will be more fully understood in the light of the following description of one specific embodiment. The description is made with reference to the accompanying drawing of which:

Figure 1:
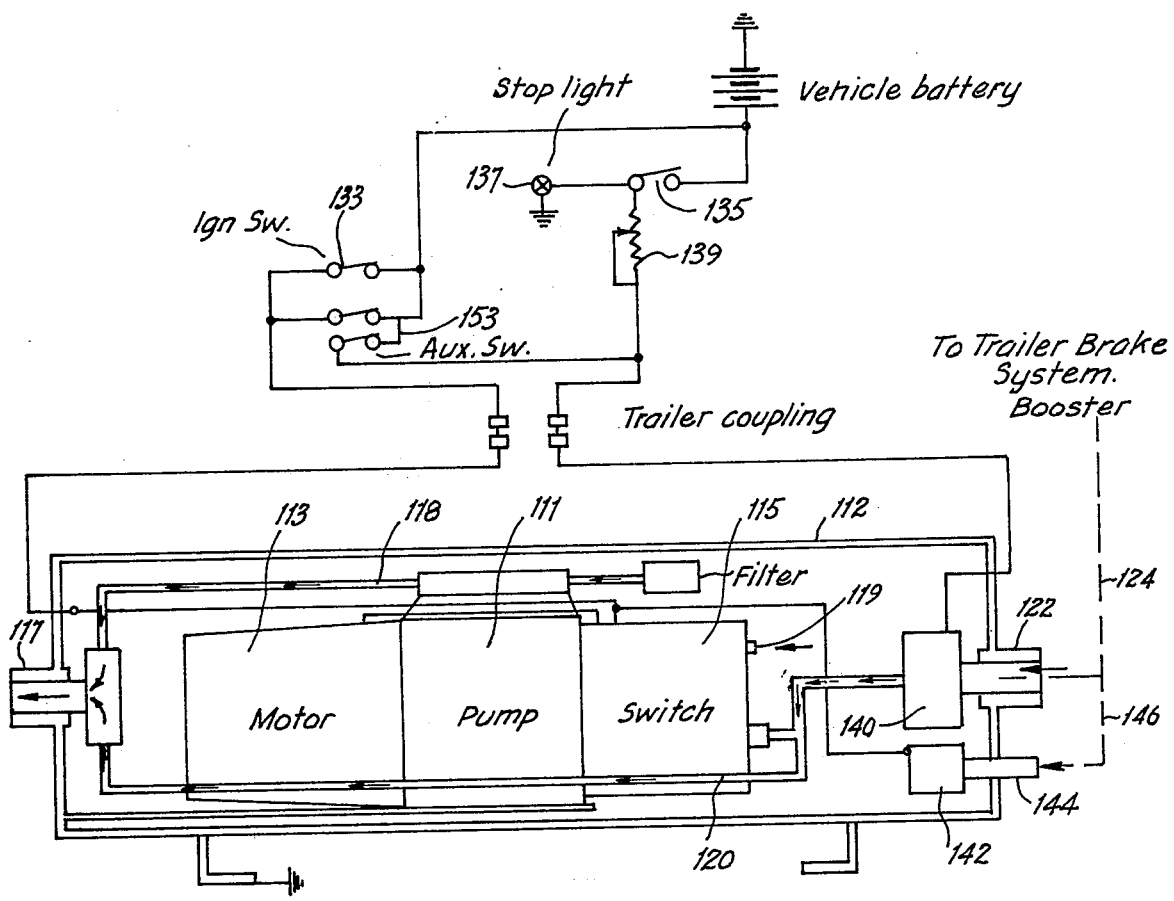
FIG. 1 is a schematic representation of the embodiment.
Figure 2:
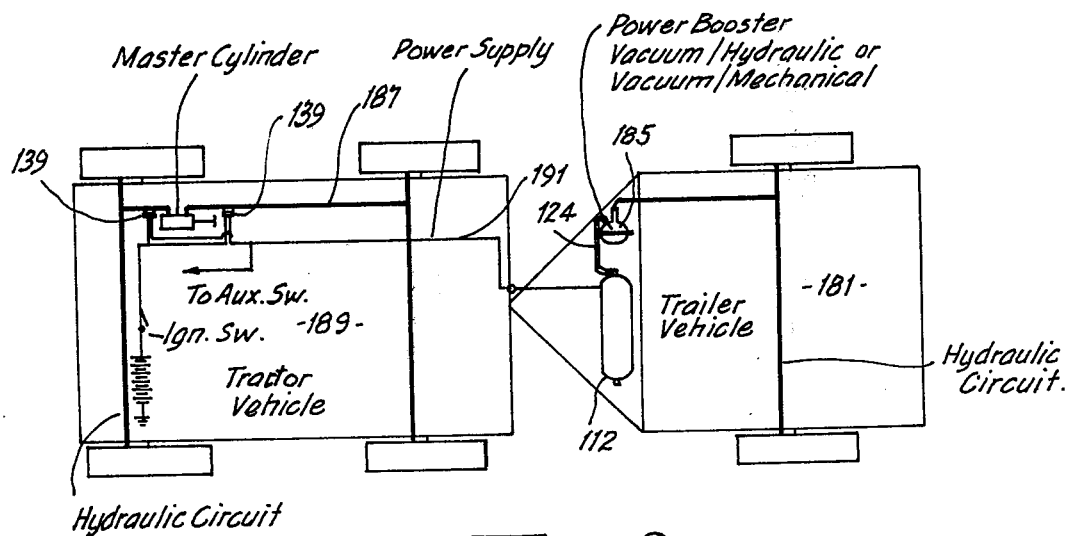
FIG. 2 is a schematic view showing the relative layout of the components of the embodiment.

The embodiment of FIGS. 1 and 2 are directed to use in trailing vehicles where the vacuum for the operation or assistance in operation is provided independently from the tractor vehicle. The embodiment comprises a vacuum pump 111 of any suitable design and of a capacity commensurate with the capacity of the vacuum system to which it is to be connected. The pump is directly connected to an electric motor 113 which is connected to the battery of the tractor vehicle and/or to an independent battery. The connection to the battery is via a pressure differential responsive switch 115 which is responsive to variations of pressure within the system and which is mounted within the pump body. The entire assembly of the motor 113, pump 111 and switch 115 is mounted within a fluid pressure reserve tank 112. The inlet of the vacuum pump has a filter 114 and a non return valve incorporated therein to prevent fluid leakage through the pump and to the fluid pressure reserve tank. The outlet from the pump is exhausted to the atmosphere through the line 118 and outlet 117 in the fluid pressure reserve tank. The pressure responsive switch 115 is a pressure differential switch having one portion open through inlet 119 to the vacuum in the fluid pressure reserve tank 112 and another portion vented to the atmosphere through line 120. The fluid pressure reserve tank is connected into the vacuum system of the vehicle through inlets 122 and 144 and lines 124 and line 146 which interconnects inlet 144 and line 122.

The inlet 122 to the reserve tank connecting the brake mechanisms to the reserve tank via line 124 has solenoid valve 140 mounted therein which provides a controlled flow of air through the inlet. The solenoid valve is connected into the electrical braking circuit of the tractor vehicle having the stop switch 135, stop lights 137 and ignition switch 133 incorporated therein. In addition there is a variable resistance 139 which is controlled by the pressure applied to the brake circuit by the brake pedal.

Figure 3:
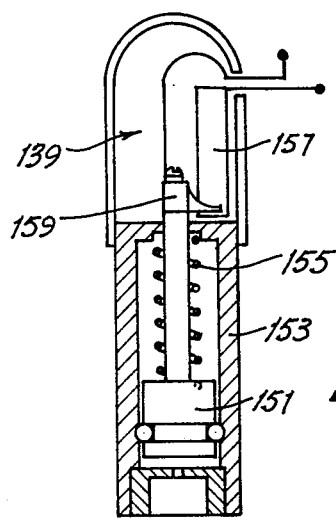
FIG. 3 is a side sectional elevation of a fluid pressure sensor which may be used in the embodiment.

An example of a sensor of the pressure in the brake circuit is shown in FIG. 3. The sensor comprises a piston 151 slidably mounted in a housing 153. The inner end is in communication with the fluid of the tractor vehicles hydraulic system. The piston is biassed by spring 155 to its lowermost position. Variable resistance 139 is incorporated in the outer end of the piston and comprises a winding 157 and a tapping 159 mounted on the outer end of the piston. As the fluid pressure in the hydraulic circuit is increased the piston 151 is depressed causing the tapping 159 to slide up the winding 157 and decrease the resistance of the variable resistance 139. The increased current flow from the variable resistance 139 activates the solenoid valve 140 in the pressure reserve tank 112. The variable resistance may or may not be installed in series with the stop light switch.

Where the tractor vehicles braking system is operated by air pressure, vacuum or is power assisted the sensor may be modified in the desired manner to accommodate such.

Figure 4:
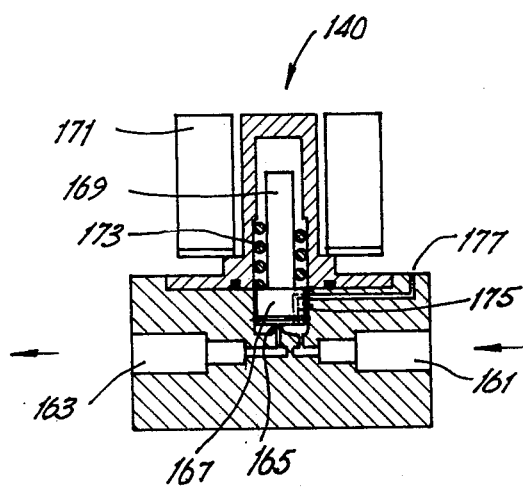
FIG. 4 is a side sectional elevation of a solenoid valve which may be used in the embodiment.

A form that the solenoid valve may take is shown in FIG. 4. The solenoid comprises an inlet 161 and an outlet 163. The inlet opens to a valve seat 165 which is selectively closed by a valve member 167. The inlet 161 communicates with the space adjacent the valve seat 165 and on the disengagement of the valve member 167 from the valve seat 165 there is permitted free fluid flow from the inlet to the outlet. The outer end of the valve member has incorporated thereon a plunger 169 partially surrounded by a solenoid 171. The valve member is biassed to the closed position by a spring 173 but upon a current flowing through the solenoid the plunger 169 and valve member 167 is raised to permit fluid flow through the valve.

In addition the valve member 167 is provided with an air bleed passageway 175 which is intended to mate with a corresponding passageway 177 in the valve housing when the valve is closed and be sealed off when the valve is opened. The purpose of the passageways 175 and 177 is to vent the brake system when the valve is closed and so release the brakes. Fluid line 179 provides fluid access between the passageway 177 in the solenoid valve and line 120 connecting the switch 115 to atmosphere. Upon ignition switch 133 being closed and the brake pedal being depressed the stop switch 135 is closed and the variable resistor 139 is activated by the sensor in the brake fluid circuit to control the degree of opening of the solenoid valve 140. Therefore the greater the pressure applied to the braking system in the tractor vehicle the greater the electrical impulse to the solenoid valve and the greater the braking applied to the trailing vehicle.

Figure 5:
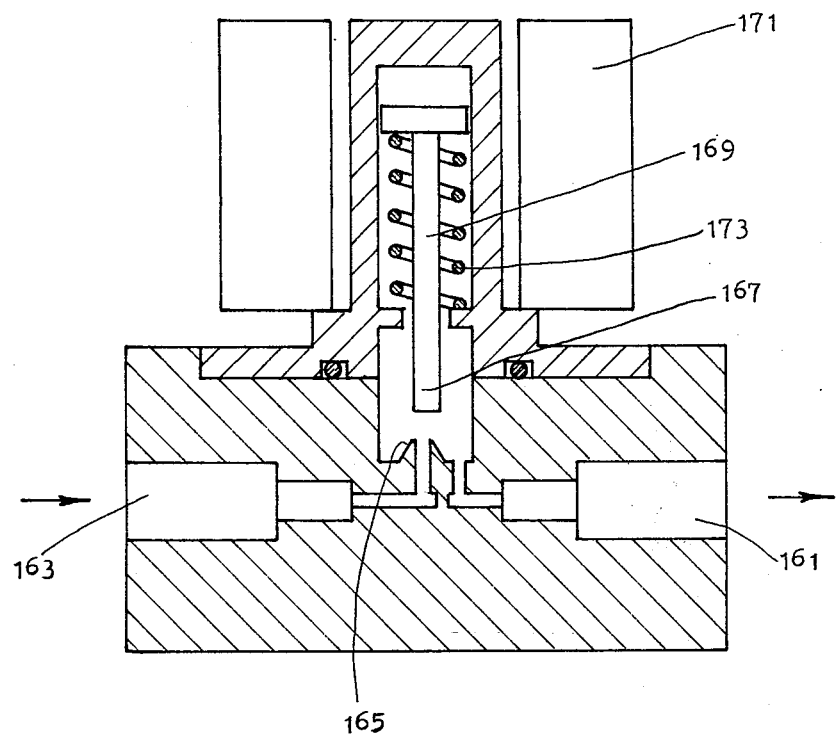
FIG. 5 is a side elevation of a solenoid valve which may be used in the embodiment.

A second solenoid valve 142 may be incorporated in the second inlet 144 in the reserve tank 112. The second inlet 144 is connected by a by-pass line 146 to the brake line 124. The solenoid valve may take a similar form to that shown in FIG. 5 which operates in much the same manner as that in FIG. 4 but in the reverse manner (the reference numerals being applied to the valve shown in FIG. 4 being applied to similar elements of the valve of FIG. 5). The valve is held closed while an electrical current is passing through it since the solenoid is connected into the electrical circuit of the tractor vehicle. In the event of a breakaway between the tractor and trailing vehicle the electrical connection to the solenoid valve 142 is broken causing the valve to open resulting in the application of the brakes to the trailing vehicle. A dump valve may be incorporated in the line 146 to permit the brakes to be vented when it is required to move a trailer not attached to a tractor vehicle.

A further preferred feature incorporates an auxilliary switch 153 which has an overriding effect when "on" over the ignition switch 133 and maintains the pressure responsive switch 115 active and maintains solenoid valve 140 fully open by bypassing resistor 139. Such a feature facilitates safe parking of the trailer and tractor vehicles by means of full reservoir vacuum or pressure being applied to the brake booster, resulting in brakes being applied to their maximum capacity and also the unit is alive and will recover any lost pressure or vacuum through leakage.

As may be seen in FIG. 2 the embodiment is mounted in a trailer 181 having a hydraulic brake circuit 183 with a vacuum assist 185 operated from the vacuum source tank 112 through line 124 as shown in FIG. 1. The operation of the brakes is ultimately controlled from the hydraulic circuit 187 of the tractor vehicle 189. The hydraulic circuit has pressure sensor operated variable resistors 139 mounted therein which are connected to the solenoid valves in the tank 112 on the trailer through electrical circuit 191.

While the invention has been described in terms of a vacuum operated or assisted system it will be appreciated that there would be little difficulty in adapting the embodiments to a pressurised system. In addition it should be appreciated that the scope of the invention cannot be limited to the particular scope of the embodiment described herein.

I claim:

1. A vacuum or pressure unit in a vacuum or pressure system of a trailer vehicle wherein the vacuum or pressure system operates at least one of the vehicle components and is the sole source of vacuum or pressure, the vacuum or pressure unit comprising a pump in fluid communication with the vacuum or pressure system of the trailer vehicle, an electric motor operatively connected to the pump to drive the pump, a source of electrical energy connected to said motor, a pressure responsive electric switch mounted in the vacuum or pressure system of the vehicle and connected between said source of electrical energy and said motor, the pressure responsive electric switch closing the electrical circuit between the electric motor and the electrical energy source to activate the electric motor when the magnitude of pressure in the vacuum or pressure system is insufficient to operate the vehicle components at the desired efficiency, the pump, electric motor and switch being mounted in a fluid tight vacuum or pressure reserve tank, said reserve tank having a first port through which the pump communicates to the atmosphere and a fluid tight connection between the first port and the pump, and having a second port through which the interior of the reserve tank is in communication with the vacuum or pressure system of the vehicle, said second port having a solenoid valve providing a variable flow through the second port, the degree of flow through the solenoid valve being dependent upon the pressure applied to the braking system of the tractor vehicle.

2. A unit as claimed in claim 1 wherein said reserve tank has a third port in communication with the vacuum or pressure system of the trailer vehicle, said third port having a solenoid valve connected into the electrical circuit of the tractor vehicle such that the solenoid valve is held closed only when an electric current passes through the valve.

3. A unit as claimed in claim 1 including a separate electrical circuit between the electrical energy source and the pressure responsive electrical switch and between the electrical energy source and the solenoid valve, and an auxilliary switch being closed when the pressure responsive electrical switch is maintained activated and the solenoid valve is fully opened.

* * * * *